(12) United States Patent
Jensen et al.

(10) Patent No.: US 6,689,063 B1
(45) Date of Patent: Feb. 10, 2004

(54) METHOD AND APPARATUS FOR ACQUIRING IMAGES BY RECURSIVE ULTRASOUND IMAGES

(75) Inventors: Jørgen Arendt Jensen, Lyngby (DK); Svetoslav Nikolov, Lyngby (DK)

(73) Assignee: B-K Medical A/S, Gentofte (DK)

( * ) Notice: Subject to any disclaimer, the term of this patent is extended or adjusted under 35 U.S.C. 154(b) by 0 days.

(21) Appl. No.: 09/959,847

(22) PCT Filed: May 10, 2000

(86) PCT No.: PCT/DK00/00245

§ 371 (c)(1),
(2), (4) Date: Nov. 9, 2001

(87) PCT Pub. No.: WO00/68931

PCT Pub. Date: Nov. 16, 2000

(30) Foreign Application Priority Data

May 10, 1999 (DK) ......................... 1999 00635

(51) Int. Cl.[7] .................................................. A61B 8/00

(52) U.S. Cl. ........................................................ 600/443

(58) Field of Search .............................. 600/407–471; 367/7, 11, 130, 138; 73/625, 626; 378/98; 128/916

(56) References Cited

U.S. PATENT DOCUMENTS

| | | | |
|---|---|---|---|
| 5,119,342 A | 6/1992 | Harrison, Jr. et al. | ............ 367/7 |
| 5,121,361 A | 6/1992 | Harrison, Jr. et al. | ............ 367/7 |
| 5,345,939 A | 9/1994 | Engeler et al. | ........ 128/661.01 |
| 5,483,963 A * | 1/1996 | Butler et al. | ................ 600/437 |
| 5,511,550 A * | 4/1996 | Finsterwald | ................ 600/459 |
| 5,732,706 A * | 3/1998 | White et al. | ................ 600/437 |

OTHER PUBLICATIONS

K. E. Thomenius, Evolution of ultrasound beam formers. In *Proc. IEEE Ultrason. Symp.*, pp. 1615–1621, 1996.

G. R. Lockwood, J. R. Talman, and S. S. Brunke. Real–time 3–d ultrasound imaging using sparse synthetic aperture beam forming. *IEEE Trans. Ultrason., Ferroelec. Freq. Contr.*, 45:980–987, 1998.

G. R. Lockwood and F. S. Foster. Design of sparse array imaging systems. In *Proc. IEEE Ultrason. Symp.*, pp. 1237–1243, 1995.

(List continued on next page.)

*Primary Examiner*—Ali M. Imam
(74) *Attorney, Agent, or Firm*—Finnegan, Henderson, Farabow, Garrett & Dunner, L.L.P.

(57) ABSTRACT

A method and apparatus for recursive ultrasound imaging using a Synthetic Transmit Aperture and by which a new frame is created at every pulse emission. In receive, parallel beam forming is implemented. The beam formed RF data is added to the previously created RF lines. To keep the level of the signal, the RF data obtained previously, when emitting with the same element, is subtracted from the RF lines. Up to 5000 frames/sec can be achieved for a tissue depth of 15 cm with a speed of sound of c=1540 m/s. The high frame rate makes continuous imaging data possible, which can significantly enhance flow imaging. A point spread function 2° wide at −6 dB and grating lobes of ≦−50 dB is obtained with a 64 elements phased array with a central frequency $f_0$=3 MHz using a sparse transmit aperture using only 10 elements ($N_{xmt}$=10) during pulse emission. The corresponding images have the quality of a dynamically focused image in transmit and receive. The dynamic focusing gives a small sampling volume and the capability to view small blood vessels and obtain the velocity profiles within the vessels with lower variance than with normal imaging.

25 Claims, 9 Drawing Sheets

Schematic block diagram of the main components of the system.

OTHER PUBLICATIONS

J. T. Ylitalo. On the signal–to–noise ratio of a synthetic aperture ultrasound imaging method. *Eur. J. Ultrasound*, pp. 277–281, 1996.

G. E. Tupholme. Generation of acoustic pulses by baffled plane pistons. *Mathematika*, 16:209–224, 1969.

P. R. Stepanishen. Transient radiation from pistons in an infinite planar baffle. *J. Acoust. Soc. Am.*, 49:1629–1638, 1971.

J. A. Jensen and N. B. Svendsen, Calculation of pressure fields from arbitrarily shaped, apodized, and excited ultrasound transducers. *IEEE Trans. Ultrason, Ferroelec., Freq. Contr.*, 39:262–267, 1992.

J. A. Jensen. A model for the propagation and scattering of ultrasound in tissue. *J. Acoust. Soc. Am.*, 89:182–191, 1991a.

* cited by examiner

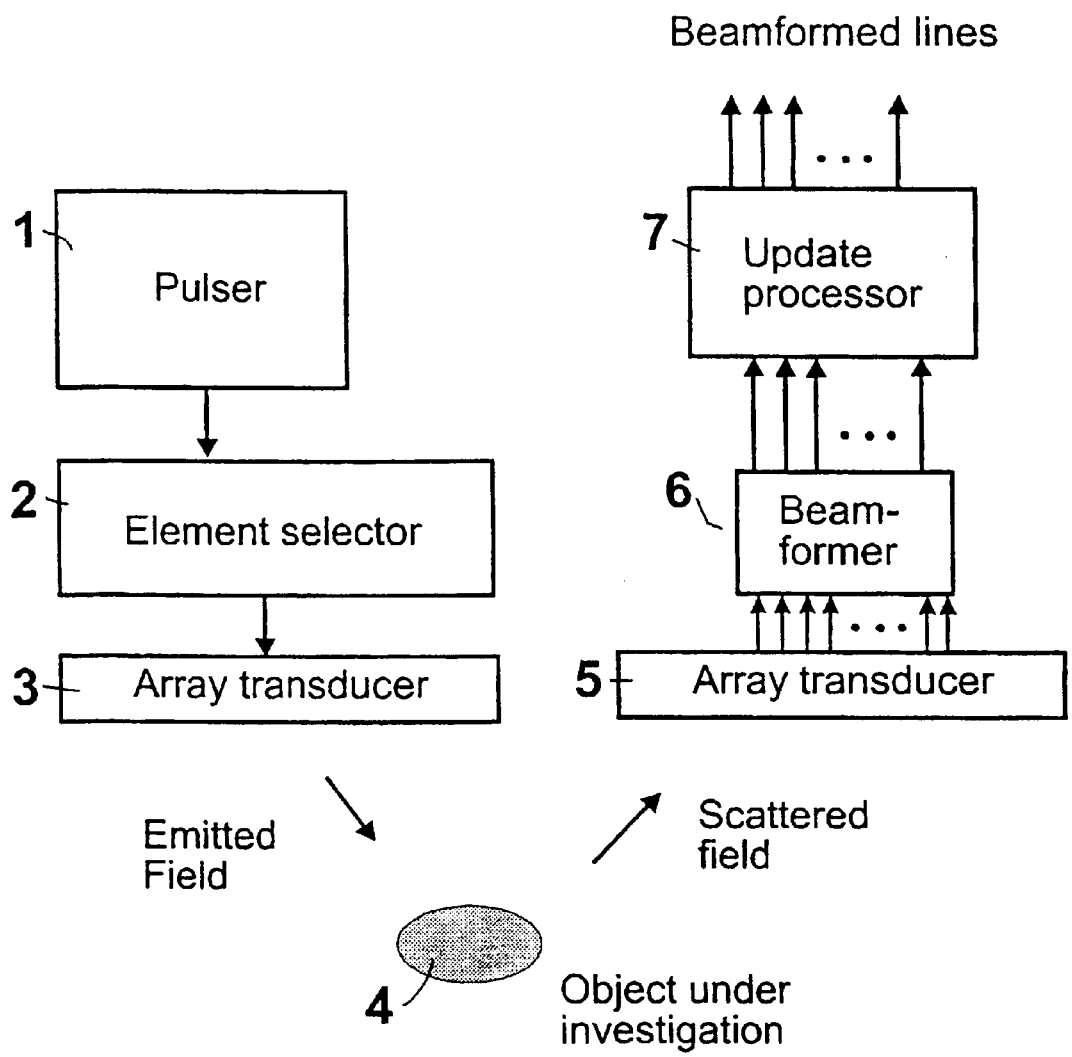
Figure 1: Schematic block diagram of the main components of the system.

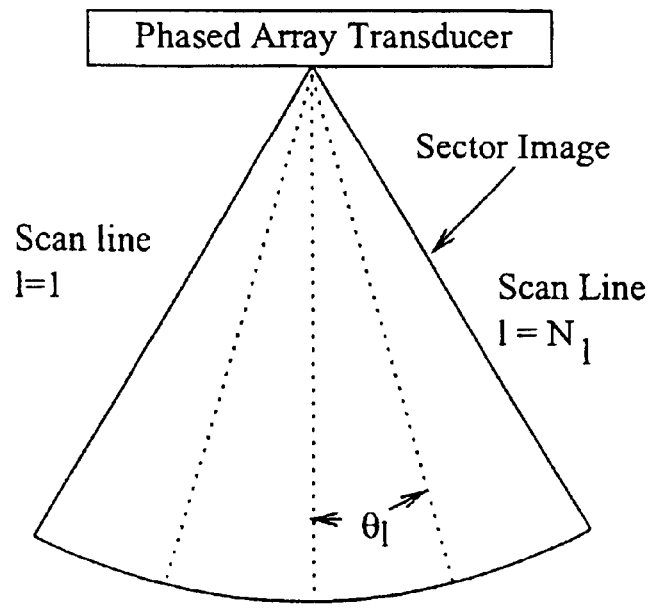
Figure 2: Sector image created with phased linear array transducer.
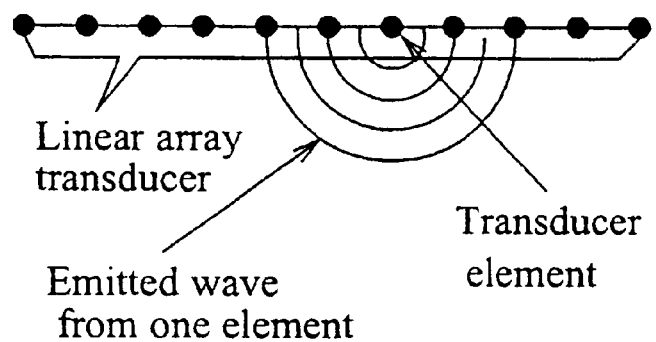
Figure 3: Radiation pattern of a single transducer element.

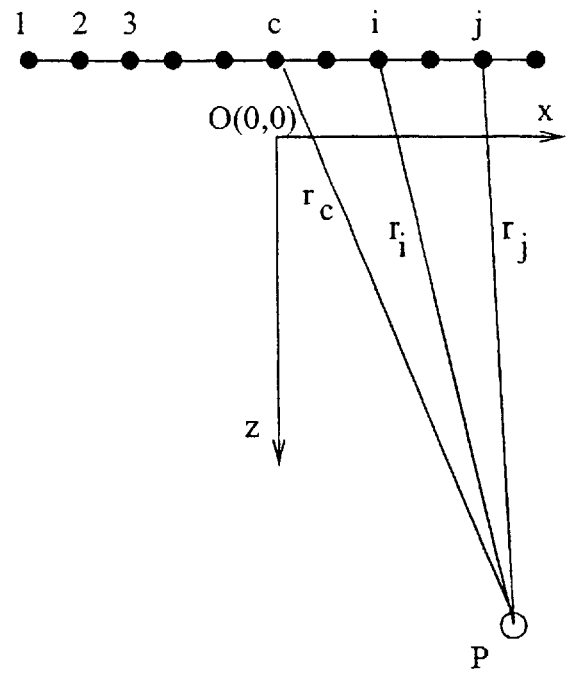
Figure 4: Distance traveled by the ultrasound signals from each of the transducer elements to a point $P$.
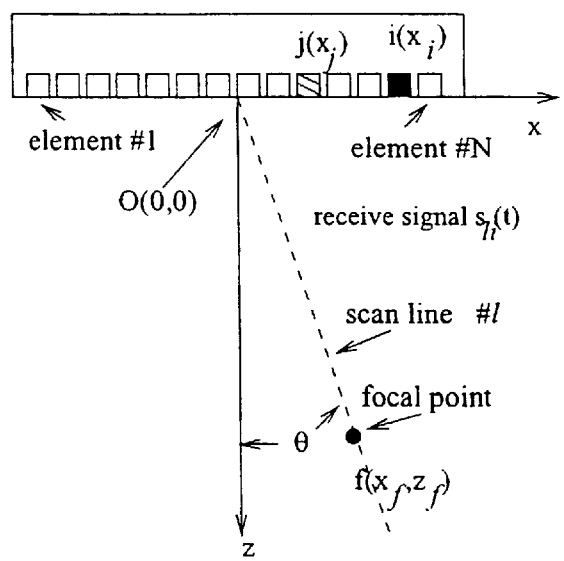
Figure 5: Delay calculations. The reference point is $O(0,0)$. The focal point $f(x_f, z_f)$ lies on the current scan line $l$. The $z$ coordinate of the transducer elements is zero, and it is not used in the notations for simplicity.

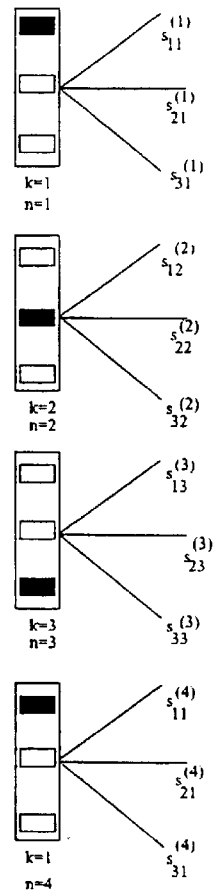
Figure 6: Creating synthetic transmit aperture image. The black square indicates the position of the element used for emission.
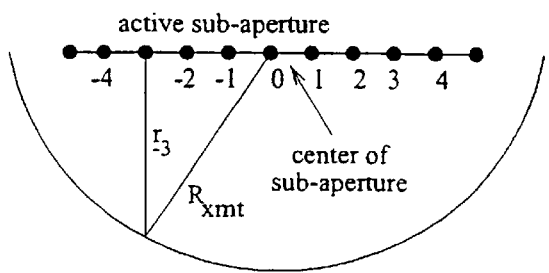
Figure 7: Approximation of the radiation pattern of a single element with a sub-aperture containing 11 elements. The indeces of the elements are relative to the center of the sub-aperture.

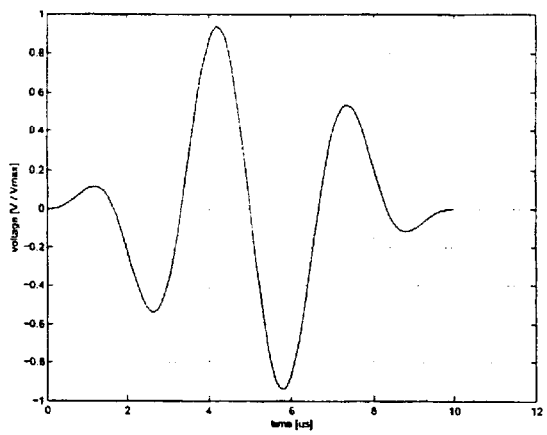
Figure 8: The excitation pulse used in the simulations.
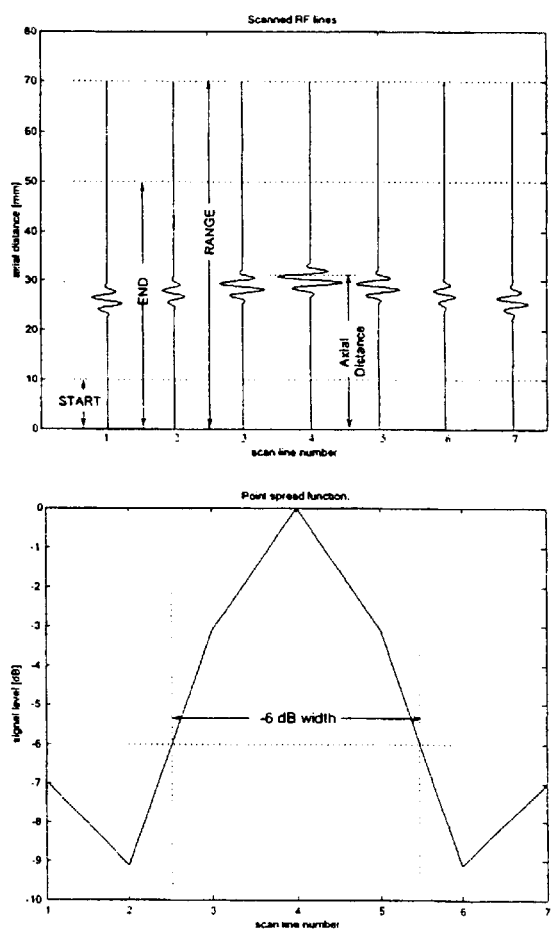
Figure 9: Illustration of the notation in the plots of the point spread function. The number of the scan line determines the angle.

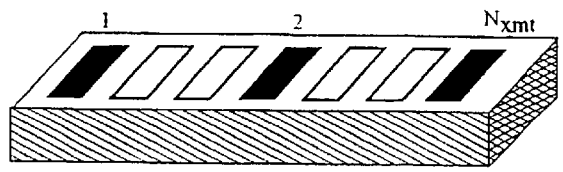
Figure 10: The relation between the number of the skipped elements between two emissions and number of emissions. On this Figure a linear array with 7 transducer elements is shown. The number of elements that are skipped is 2, indicating 3 emissions.
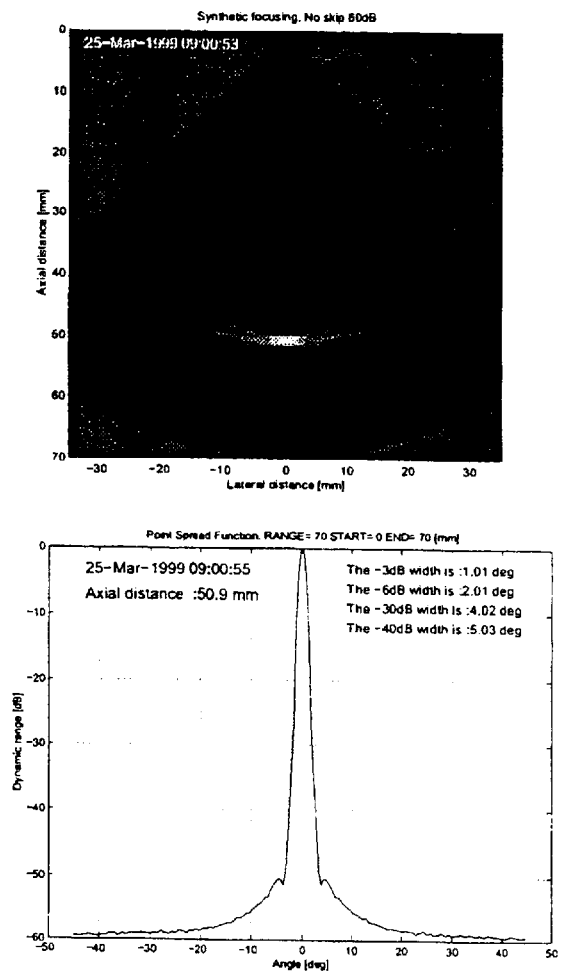
Figure 11: Point spread function of a synthetic transmit array focusing system. $N_{xmt} = 64$, $N_{active} = 1$

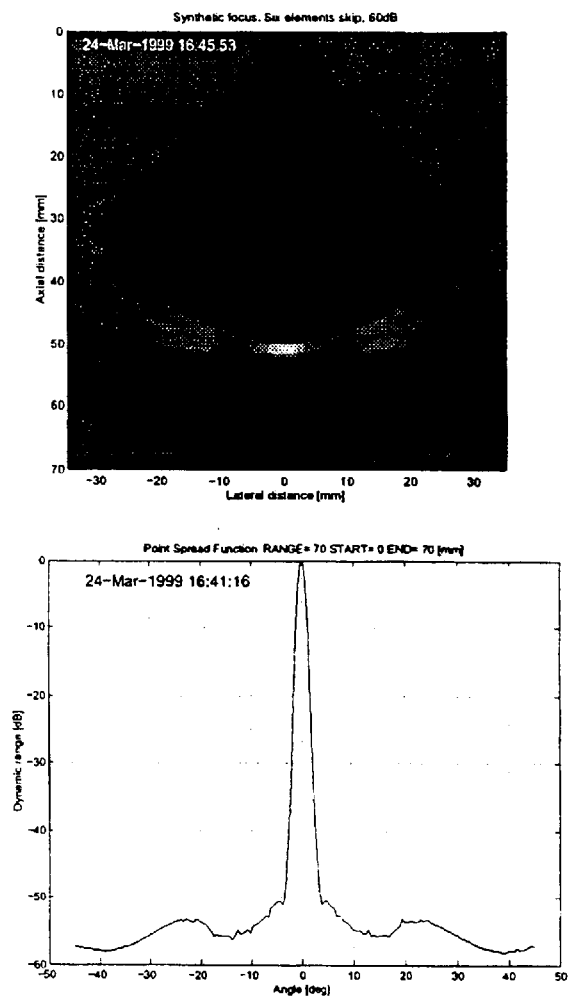
Figure 12: Point spread function of a synthetic transmit array focusing system. $N_{xmt} = 13$, $N_{active} = 1$

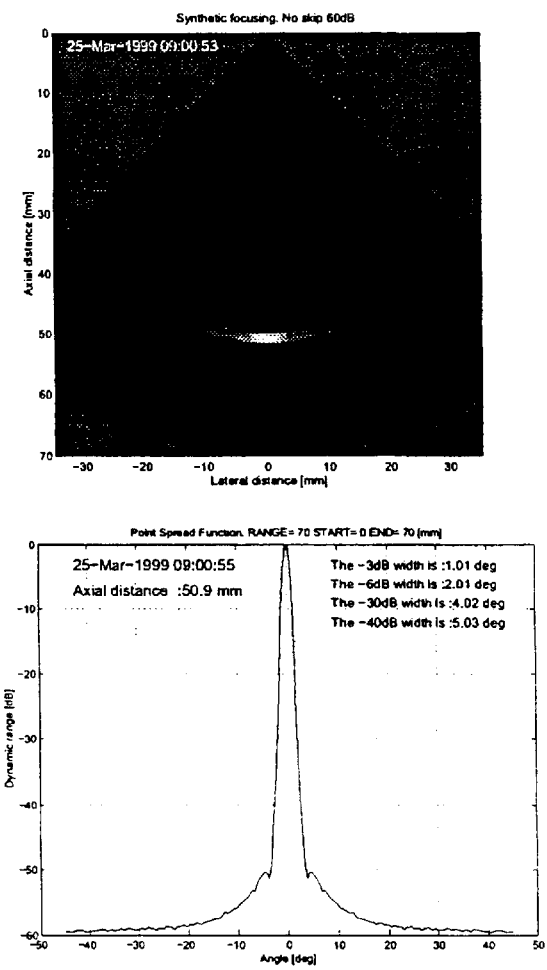
Figure 13: Point spread function of a synthetic transmit array focusing system. $N_{xmt} = 64$, $N_{active} = 11$

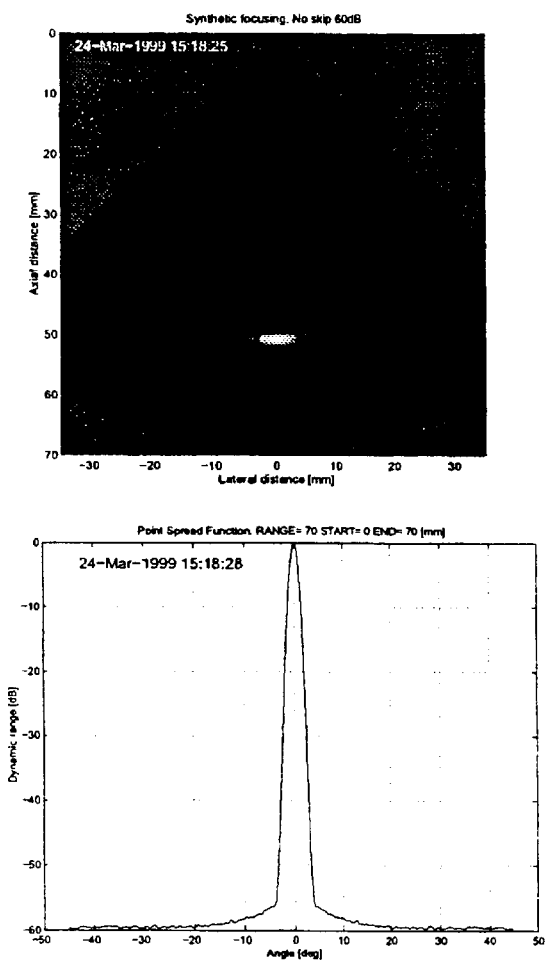
Figure 14: Point spread function of a synthetic transmit array focusing system. $N_{xmt} = 64$, $N_{active} = 11$. Transmit apodization is applied.

METHOD AND APPARATUS FOR ACQUIRING IMAGES BY RECURSIVE ULTRASOUND IMAGES

FIELD OF THE INVENTION

The invention relates to an apparatus for fast imaging of eg the human body using ultrasound.

The image is made using a multi-element probe in which all or selected ones of the elements are used as transmitters. The reflected signal from the object is then measured by all elements and ultrasound beams are simultaneously focused throughout the imaging region. The image is updated with the new information every time a new element or a group of elements are used as a transmitting aperture. Hereby the image is continuously updated and can be used for probing moving structures and enhance the imaging of blood velocities.

BACKGROUND OF THE INVENTION

The technological development has constantly led to improvements in ultrasound beam formers as described in [1]. The introduction of digital beam formers made the dynamic receive focusing possible. Unfortunately it is not possible to dynamically control the transmitted acoustic energy, and only a fixed focus is used in transmit.

The basic concept of focusing is to constructively add energy in the combined transmit-receive signal. Ideally, by means of the receive processing it is possible to compensate for the phase changes in the transmit. This corresponds to a dynamically focused transmit and receive imaging system. A composite image (obtained by multiple emissions, focused at different depths in transmit) is the ideal reference image.

One way to obtain a dynamic transmit focus is to use synthetic array imaging. There are three variations of the synthetic aperture imaging. 1: using a synthetic transmit aperture, 2: using a synthetic receive aperture, and 3: using a combination of synthetic transmit-receive aperture. All of these combinations have been studied, and have shown different advantages and drawbacks. The time necessary to acquire a single image $T_{acquire\ image}$ is proportional to the number of emissions $N_{emission}$, the time necessary to record the reflected ultrasound wave from a single emission $T_{record\ emission}$, the number of scan lines $N_1$, and it is inversely proportional to the number of the parallel receive beam formers $N_{parallel}$:

$$T_{aquireimage} = T_{acquirescanline} \cdot N_{emission} \cdot N_1 / N_{parallel} \quad (1)$$

The acquisition time for an image, with a typical depth of 15 cm assuming that the speed of sound is 1540 m/s, is 200 $\mu$s. If $N_{emission}=64$ and $N_1=N_{parallel}$ then $T_{acquire\ image}=12.8$ ms, which results in 78 frames/sec. For every new frame in the imaging process, the data acquired for the previous frame is discarded.

The recursive imaging method and apparatus according to the invention uses the beam formed lines from the previous frame to create a new frame after every emission. This results in $N_{emission}=1$, $T_{acquire\ image}=200$ $\mu$s, and a frame rate of 5000 frames/sec. The invention uses a synthetic transmit aperture and preferably receives with the full aperture. The prior art synthetic transmit aperture focusing [2], [3] is presented below. Based on it, the new recursive ultrasound imaging technique according to the invention is mathematically derived and discussed below.

One of the problems in emitting with only one element is the signal-to-noise ratio, since there are physical limitations to what power can be sent with a single transducer array element. The problem was previously studied [2], [4], and a solution using multiple elements in transmit was suggested in [2]. This problem is discussed below.

The other problem is the presence of motion artifacts due to the time of acquisition for a single image. This is avoided with the invention by decreasing the number of emissions necessary to create one frame. This can be done with a sparse synthetic aperture, and the results of the decreased number of emissions is presented.

Prior Art Synthetic Array Imaging

Phased linear arrays are used for creating sector B-mode images as shown on FIG. 2. The image consists of a number of scan lines $N_1$. The scan lines $l=(1 \ldots N_1)$ have a common origin. Each of them has a different angle $\theta_1$ with the normal vector to the transducer's surface. For simplicity all considerations are made only in the z-x plane, and it is assumed that a single transducer element emits a cylindrical wave propagating at a constant speed c in a linear medium, as shown in FIG. 3.

The measurement situation is shown in FIG. 4. Element i with center coordinates $(x_i,z_i)$ emits a spherical wave. The wave front reaches point $P(x_P,z_P)$ after time $$t_{iP} = \frac{\sqrt{(x_P - x_i)^2 + (z_P - z_i)^2}}{c}, \quad (2)$$

where c is the speed of sound. If all the elements are excited, they will form a pressure field in front of the transducer, which is a sum of the fields created by each of the elements. The emitted waves reach point P at different time instances depending on the element positions.

In order to align the wave fronts and thereby focus the acoustic energy in point P, the signals from the individual array elements must be appropriately delayed. In the calculation of the delays, one point from the transducer is selected as a reference point. All the delays are calculated relative to the time necessary for a sound wave to travel the distance between the reference point and the focal point. For a sector image, the center of the transducer array is the usual choice. The reference point is the center of element $C(x_c,z_c)$ for the case depicted on FIG. 4. The delay for element i for focusing the energy at point $P(x_p,y_p)$ is calculated by:

$$d_i = t_{CP} - t_{iP} \quad (3)$$

$$d_i = \frac{\sqrt{(x_C - x_P)^2 + (z_C - z_P)^2} - \sqrt{(x_i - x_P)^2 + (z_i - z_P)^2}}{c}$$

FIG. 5 shows the geometry used for the simulations. The origin of the coordinate system O(0,0) lies in the middle of the physical linear array transducer. All scan-lines (l=1 ... $N_1$) start from the origin O and have angle $\theta_1$ with the z-axis. The focal points lie on these scan lines and have coordinates:

$$x_{fl} = r_f \sin\Theta_1$$
$$z_{fl} = r_f \cos\Theta_1 \quad (4)$$

where $r_f$ is the axial distance to the focal point. Dynamic focusing is obtained if $r_f$ changes in time as $$r_f = ck/f_s \quad (5)$$

where k is the sample number and $f_s$ is the sampling frequency. In conventional imaging systems the transmission uses a fixed $r_f$, whereas the receive can be dynamically focused along the current scan line.

One way to create a synthetic aperture image is to emit with all the elements from the transducer array one at a time (see FIG. 6). During reception data is recorded and beam formed. After a number of emissions $N_{xmt}$ all the beam formed RF lines from the separate emissions are summed to create the scan-lines that are envelope-detected and displayed.

The beam formed signal from emission n with element i for line l is $s_{li}^{(n)}(t)$. The number for the emission n ($0<n<\infty$) is relative to the beginning of the continuous imaging process. This number is relevant only for the recursive imaging and in this section a simplified notation is used: $s_{li}(t)=s_{li}^{(n)}(t)$. The time t is relative time from the emission of the pulse. The RF signal that is envelope-detected and displayed is:

$$s_l(t) = \sum_{i=1}^{N_{xmt}} s_{li}(t) \qquad (6)$$

$$s_{li}(t) = \sum_{j=1}^{N_{rcv}} a_{lij} \cdot s_{ij}(t - d_{lij}) \qquad (7)$$

where $N_{xmt}$ is the number of transmit elements, $N_{rcv}$ is the number of receive elements, $s_{ij}(t)$ is the recorded data, $a_{lij}$ is a weighting coefficient (apodization), and $d_{lij}$ is the delay for image line l, when emitting with element i and receiving with element j.

The delays $d_{lij}$ is the sum of the delays for elements i and j calculated with formula (3) for the points in line l $$d_{lij}=d_{li}+d_{lj}$$

For the case in FIG. 5, the delays are calculated by:

$$d_{lij} = \frac{\sqrt{x_{fl}^2 + z_{fl}^2} - \sqrt{(x_i - x_{fl})^2 + z_{fl}^2}}{c} + \frac{\sqrt{x_{fl}^2 + z_{fl}^2} - \sqrt{(x_j - x_{fl})^2 + z_{fl}^2}}{c}. \qquad (8)$$

This is the basic formula for a geometrical quadrature focusing. In Eq. (8) $(x_{fl}, z_{fl})$ are the coordinates of the focal point, $x_j$ is the coordinate of the center of the j'th element and $x_i$ is the coordinate of the center of the i'th element. In transmit, the delay for element i is equal to zero, and in receive the delay for element j is equal to $d_{lij}$.

The synthetic array imaging assumes that the tissue under investigation is stationary, which is often not the case in medical ultrasound. The images will, thus, be blurred and the synthetic array imaging cannot be used for velocity estimation.

SUMMARY OF THE INVENTION

It is the object of the invention to overcome this deficiency and disadvantage of the known kinds of apparatus. With the invention this object is achieved by an apparatus that continually updates the image using the current pulse emission thereby obtaining a continuous image for tracking moving structures.

The concept of the invention is as follows: A new frame n is created, based on the previous frame n−1 and the data acquired at the last emission. The calculation procedure is derived from a synthetic array aperture imaging technique as presented and further developed.

Recursive Imaging with the Invention

A simple example for synthetic imaging is shown in FIG. 6. Here n is the number for the current emission and $N_{xmt}$ is the number of transmissions between two emissions with the same element. $s_{lk}^{(n)}$ is the beam formed signal at emission n with element k for line l. The relation between n and k is given by:

$$k(n)=(n \bmod N_{xmt})+1 \qquad (9)$$

The first image can be obtained after $N_{xmt}$ emissions. Equation (6) can be rewritten as:

$$S_l^{(n)} = \sum_{m=(n-N_{xmt}+1)}^{n} a_{k(m)} \cdot s_{lk(m)}^{(m)}(t) \qquad (10)$$

Equation (10) shows that a new frame can be formed after any emission $n \geq N_{xmt}$ by summing the beam formed lines $s^{(m)}_{lk(m)}$, $n-N_{xmt}<m \leq n$. For two consecutive emissions the expression is:

$$S_l^{(n-1)}(t) = \sum_{m=(n-N_{xmt})}^{n} a_{k(m)} \cdot s_{lk(m)}^{(m)}(t) \qquad (11)$$

$$S_l^{(n)}(t) = \sum_{m=(n-N_{xmt}+1)}^{n} a_{k(m)} \cdot s_{lk(m)}^{(m)}(t)$$

$$S_l^{(n)} - S_l^{(n-1)} = a_{k(n)} \cdot s_{lk(n)}^{(n)}(t) - a_{k(n-N_{xmt})} \cdot s_{lk(n-N_{xmt})}^{(n-N_{xmt})}(t)$$

$$S_l^{(n)} = S_l^{(n-1)} + a_{k(n)} \cdot s_{lk(n)}^{(n)}(t) - a_{k(n-N_{xmt})} \cdot s_{lk(n-N_{xmt})}^{(n-N_{xmt})}(t) \qquad (12)$$

From equation (9) it can be seen that $k(n)=k(n-N_{xmt})$. In recursive imaging a new frame is created at emission n by adding the new information $\text{Info}^{(n)}$ to the image $\text{Image}^{(n-1)}$ and subtracting the information obtained at emission $n-N_{xmt}$, $\text{Info}^{(n-N_{xmt})}$. The number of summations per sample is decreased from $N_{xmt}$ in Eq. (6) to only two.

Since a new frame consisting of a number of simultaneously beam formed lines is created at every pulse emission, the image is updated after every 200 μs when c=1540 m/s, and the data is acquired to a depth of 15 cm.

Add-only Recursive Imaging

To decrease the amount of the necessary storage memory the calculation procedure can be modified to the add-only recursive imaging. Consider the following equations:

$$B = \sum_{i=1}^{N} A_i \qquad (13)$$

$$A_i = A = \text{const} \Rightarrow.$$

$$B = N \cdot A = N \cdot A + A - A = \frac{N-1}{N} \cdot N \cdot A + A = \frac{N-1}{N} \cdot B + A \qquad (14)$$

The above equations can be used to derive another formula for the recursive imaging:

$$S_l^{(n)}(t) = c_1 \cdot S_l^{(n-1)} + c_2 \cdot s_{lk}^{(n)}(t) \qquad (15)$$

where $c_1$ and $c_2$ are weighting coefficients. The constants must be chosen to ensure a constant signal level and the following condition must be fulfilled: $S_l^{(n)}(t)=S_l^{(n-1)}(t)$.

The difference between equations (12) and (15), is that instead of being subtracted the information obtained by emitting with element k decays exponentially with time. In this way the information from the past is less prone to introduce motion artifacts in the image. The other benefit is that less memory is needed, since only two frames are stored.

Equation (15) can be rewritten as a sum of the signals from two consecutive emissions:

$$S_l^{(n)}(t) = \Sigma b^{n-m} \cdot s_{lk(m)}^{(m)}(t) + s_{lk(n)}^{(n)}(t) \qquad (16)$$

assuming that $c_2=1$ and $c_1=b\leq 1$. $N_{xmt}<n<\infty$ is the number of the frame, which is equal to the number of the current emission. The same element is used after every $N_{xmt}$ emissions. Equation (16) can be expressed as a sum of the contributions from the emissions with the different elements:

$$S_l^{(n)}(t) = \sum_{k=1}^{N_{xmt}} C_{lk}^{(n)}(t) \qquad (17)$$

Here contribution of one element is the amount of information $C_{lk}^{(n)}$, added to the signal $S_l^{(n)}$ by the emissions with element k up to the moment of emission n. The contribution of the current emitting element (k(n)=i) to $S_l^{(n)}$ is:

$$C_{li}^{(n)}(t) = s_{li}^{(n)}(t) + b^{Nxmt} \cdot s_{li}^{(n-Nxmt)}(t) + b^{2Nxmt} \cdot s_{li}^{(n-2Nxmt)}(t) + \qquad (18)$$

This is a geometrical progression. If the tissue is motionless then:

$$s_{li}^{(n)}(t) = s_{li}^{(n-Nxmt)}(t) = \ldots = s_{li}(t)$$

$$C_{li}^{(n)}(t) = [1 + b^{Nxmt} + b^{2Nxmt} + \ldots] s_{li}(t) = \qquad (19)$$

$$s_{li}(t) \cdot \sum_{p=0}^{\infty} b^{pNxmt} = s_{li}(t) \cdot \frac{1}{1 - b^{Nxmt}}$$

If $b=0.8$ and $N_{xmt}=64$ then $C_{li}^{(n)}(t) \approx s_{li}^{(n)}(t)$. This means that at emission n the contribution from the emitting element is approximately equal to the newly acquired information.

With the chosen values of b and $N_{xmt}$ the contribution to the signal $S_l$ from the previous emission with the same element is 128 dB lower than the contribution from the current one and motion artifacts can be neglected.

Improving the Signal-to-noise Ratio

The advantage of the above presented imaging approach is that a dynamically focused image in transmit and receive is obtained. This is possible because a single small transducer element emits an almost spherical wave, which unambiguously determines the propagation time of the ultrasound energy.

The drawback is that the energy, which can be sent into the body with only one array element is not enough for obtaining a high penetration depth. One way to increase the penetration depth is to emit energy with several elements as suggested in [2]. The delays of the elements are set in order to approximate the radiation pattern of a single element. Here the delays are calculated by:

$$d_{i_a} = \frac{R_{xmt} - \sqrt{R_{xmt}^2 - (x_{i_a} - x_a)^2}}{c} \qquad (20)$$

where a is the index of the central element, $x_a$ is the coordinate of the central element of the active aperture, $x_{i_a}$ is the coordinate of the element whose delay in transmit $d_{i_a}$ is calculated, and $R_{xmt}$ is the radius of the spherical wave. If the number of elements in the active aperture is $N_{active}$, then $R_{xmt}$ is selected to fulfill the condition:

$$R_{xmt} \geq (N_{active}-1)/2 \cdot pitch \qquad (21)$$

where pitch is the distance between the centers of two neighbor elements in the array. The elements' indices are relative to the index of the central element and are given by:

$$i_a = -(N_{active}-1)/2 \ldots (N_{active}-1)/2 \qquad (22)$$

For convenience $N_{active}$ is usually an odd number to ensure the presence of a central element. The delays in receive are calculated by formula (8), assuming that the transmitting element has the coordinate $x_a$.

The result of using multiple elements in transmit is that the signal-to-noise-ratio is increased. Let the number of transmissions be $N_{xmt}$ and the number of receiver elements $N_{rcv}$. Then the signal-to-noise ratio is proportional to:

$$SNR \sim \sqrt{N_{xmt} \cdot N_{rev}} \qquad (23)$$

If the number of the elements in the active sub-aperture is $N_{active}$ then the SNR becomes proportional to:

$$SNR \sim \sqrt{N_{ative} \cdot N_{xmt} \cdot N_{rev}}$$

Thus, using an active aperture in transmit with $N_{active}=11$ results in an 11 dB increased in SNR.

By using this approach a continuous image consisting of a number of simultaneously beam formed lines can be made at the pulse repetition frequency of the emitted ultrasound, which makes it possible to follow tissue motion.

By using a array transducer a sector scan image can be made.

By using a matrix transducer a volumetric image can be made.

By using several transducer elements during the transmission an improved signal-to-noise ratio can be obtained.

By using recursive imaging velocity images can be improved and velocity distributions can be found throughout the image.

BRIEF DESCRIPTION OF THE DRAWINGS

FIG. 1 shows a schematic block diagram of the main components of the system.

FIG. 2 shows a sector image created with phased linear array transducer.

FIG. 3 shows a radiation pattern of a single transducer element.

FIG. 4 shows the distance traveled by the ultrasound signals from each of the transducer elements to a point P.

FIG. 5 shows a delay calculation. The reference point is O(0,0). The focal point $f(x_f, z_f)$ lies on the current scan line l. The z coordinate of the transducer elements is zero, and it is not used in the notations for simplicity.

FIG. 6 shows the creation of a synthetic transmit aperture image. The black square indicates the position of the element used for emission.

FIG. 7 shows an approximation of the radiation pattern of a single element with a sub-aperture containing 11 elements. The indices of the elements are relative to the center of the sub-aperture.

FIG. 8 shows the excitation pulse used in the simulations.

FIG. 9 shows an illustration of the notation in the plots of the point-spread function. The number of the scan line determines the angle.

FIG. 10 shows the relation between the number of the skipped elements between two emissions and number of emissions. On this Figure a linear array with 7 transducer elements is shown. The number of elements that are skipped is 2, indicating 3 emissions.

FIG. 11 shows a point-spread function of a synthetic transmit array focusing system. $N_{xmt}=64$, $N_{active}=1$.

FIG. 12 shows a point-spread function of a synthetic transmit array focusing system. $N_{xmt}=13$, $N_{active}=1$.

FIG. 13 shows a point-spread function of a synthetic transmit array focusing system. $N_{xmt}=64$, $N_{active}=11$.

FIG. 14 shows a point-spread function of a synthetic transmit array focusing system. $N_{xmt}=64$, $N_{active}=11$. Transmit apodization is applied.

DESCRIPTION OF THE PREFERRED EMBODIMENT

In FIG. 1 is shown an example of a preferred embodiment of an apparatus according to the invention. This embodiment of the invention has its application within diagnostic medical ultrasound.

A typical example is visualization of the organs in the human body or the determination of blood flow.

In FIG. 1 the specific setup of the measuring apparatus itself is indicated schematically. It comprises a generator or pulser 1, an emit beam former 2 for selecting the transmission elements, a linear array ultrasound emitting transducer 3, a linear array ultrasound receiving transducer 5, a receive beam former 6 receiving signals from the receiving transducer 5, and an update processor for recursively updating the images. The pulser 1 generates a pulsed voltage signal with sinusoidal oscillations at a frequency of 3 MHz in each pulse, that is fed to the emit beam former 2. The emit beam former 2 splits up the signal from the pulser into a plurality of signals which are being fed to one or more of the respective elements of the emitting transducer array 3. The emit beam former 2 is capable of individually attenuating and delaying the signals to each or some of the elements of the transducer array 3. The ultrasound is then reflected by the object 4 and received by the elements of the transducer array 5. All of theses signals are then combined to focus all of the beams in the image in both transmit and receive in the beam processor 6 and the simultaneously focused signals are used for updating the image in the processor 7.

In the preferred embodiment the same linear array transducer is used for both emitting and receiving the pulsed ultrasound field. It consists of 64 elements with an element width of 0.26 mm and a spacing between neighboring elements of 0.03 mm. The height of the elements is 10 mm.

Simulations experimentally document the functionality of the apparatus. The simulation is performed using the impulse response method developed by Tupholme and by Stepanishen [5] in the implementation developed by Jensen and Svendsen [7]. The high accuracy of this approach, when compared to measurements, is described in Jensen [8]. The paper showed that the simulations were within 1% of the measured ultrasound fields. The simulation approach is applicable for pulsed fields and is used for three-dimensional modeling the response of multiple scatterers.

In the preferred embodiment individual elements are pulsed consecutively and the received signals are measured on all the elements of the transducer. The ultrasound beams are then focused in both transmit and receive in all directions of the image. After each emission the old information from the previous emission with the element is subtracted and the new information added. The image is thereby continuously updated.

The simulation parameters are listed in Table 1 and Table 2. A sampling frequency of $f_s=105$ MHz is used for the simulations in order to get high precision in the numerical calculations of the acoustical field. However, when creating the results, the signal is decimated 10 times after the beam forming. The excitation pulse used is shown in FIG. 8.

The point spread function (psf) details the quality of the ultrasound system. It was obtained by placing a point scatterer in front of the transducer, and creating a B-mode image (transmit—reflect—receive). The RF lines are envelope detected by a Hilbert transformation and logarithmically compressed.

The displayed images are 90° phased array images. The scan-conversion algorithm performs a bi-linear interpolation before displaying the images.

The plots of the point-spread function are created by taking the maximum value of the envelope-detected signal (see FIG. 9). On the plots, RANGE denotes the maximum axial distance from the transducer, START and END determine the depth range for the point-spread functions. Axial distance shows the depth at which the maximum of the signal is found.

Another parameter given on the figures is "Number of skipped elements". It indicates how many emissions are made before the same element is used again. The relation between these parameters are given in FIG. 10.

The elements are always used in transmit in the same order. For instance in FIG. 10 this means that the emission order in time is 1, 4, 7, 1, 4, 7,. This is necessary when equation (12) is used for imaging because it involves subtracting the information from the previous emission. However, if equation (15) is used, the elements can "interleave" and have a different emission patterns, e.g., 1, 4, 7, 2, 5, 3, 6, 1, 4, 7. The received signals, are not weighted (i.e. there is no apodization in transmit).

FIG. 11 shows the psf for 64 emissions with one element at a time. Reducing the number of transmitting elements to 13 gives the pfs shown in FIG. 12. The data for the psf's are shown in Table 3.

In order to increase the penetration depth and the signal-to-noise ratio, more than one element can be used during transmission. The idea is to send a spherical wave with eleven elements. A Hanning window is applied on the amplitudes of the sending elements. The received signals are not weighted (no transmit apodization is applied). FIG. 13 shows the psf for 64 emissions, and FIG. 14 when apodization is used during the emissions. The data for the psf's are shown in Table 4.

TABLE 1

General parameters.

| System parameter | Notation | Value | Unit |
| --- | --- | --- | --- |
| Speed of sound | c | 1540 | m/s |
| Central frequency of excitation | $f_0$ | 3 | MHz |
| Central wavelength of excitation | $\lambda_0$ | 0.51333 | mm |
| Sampling frequency | $f_s$ | 105 | MHz |
| Oscillation periods | $N_{OSC}$ | 3 | |

TABLE 2

Parameters of the simulated phased array transducer

| Transducer parameter | Notation | Value | Unit |
| --- | --- | --- | --- |
| Central transducer frequency | $f_0^{(tr)}$ | 3 | MHz |
| pitch | pitch | 0.257 | mm |
| Width of a single element | w | 0.227 | mm |
| Kerf | Krf | 0.030 | mm |
| Height of the element | h | 10 | mm |
| Number of receive elements | $N_{rev}$ | 64 | |
| Relative two-sided −6 dB bandwidth | B | ≧70 | % |

TABLE 3

The point spread function of a system with $N_{active} = 1$.

| Number of emissions | −3 dB bandwidth | −40 dB bandwidth | Position of grating lobe | Grating lobe level |
|---|---|---|---|---|
| 64 | 1.01° | 5.03° | — | — |
| 22 | 1.01° | 5.03° | ±40° | −58 dB |
| 13 | 1.01° | 5.03° | ±20° | −54 dB |
| 10 | 1.01° | 5.03° | ±16° | −51 dB |
| 8 | 1.01° | 5.03° | ±13° | −48 dB |
| dB | 1.01° | 5.03° | ±10° | −45 dB |

TABLE 4

The point spread function of a system with $N_{active} = 11$.

| Number of emissions | −3 dB bandwidth | −40 dB bandwidth | Position of grating lobe | Grating lobe level |
|---|---|---|---|---|
| 64 | 1.01° | 5.03° | — | — |
| 13 | 1.01° | 5.03° | ±20° | −53 dB |
| 8 | 1.01° | 5.03° | ±13° | −48 dB |

REFERENCES

[1] K. E. Thomenius. Evolution of ultrasound beam formers. In *Proc. IEEE Ultrason. Symp.*, pages 1615–1621, 1996.

[2] G. R. Lockwood, J. R. Talman, and S. S. Brunke. Real-time 3-d ultrasound imaging using sparse synthetic aperture beam forming. *IEEE Trans. Ultrason., Ferroelec., Freq. Contr.*, 45:980–987, 1998.

[3] G. R. Lockwood and F. S. Foster. Design of sparse array imaging systems. In *Proc. IEEE Ultrason. Symp.*, pages 1237–1243, 1995.

[4] J. T. Ylitalo. On the signal-to-noise ratio of a synthetic aperture ultrasound imaging method. *Eur. J. Ultrasound*, pages 277–281, 1996.

[5] G. E. Tupholme. Generation of acoustic pulses by baffled plane pistons. *Mathematika*, 16:209–224, 1969.

[6] P. R. Stepanishen. Transient radiation from pistons in an infinite planar baffle. *J. Acoust. Soc. Am.*, 49:1629–1638, 1971.

[7] J. A. Jensen and N. B. Svendsen. Calculation of pressure fields from arbitrarily shaped, apodized, and excited ultrasound transducers. *IEEE Trans. Ultrason., Ferroelec., Freq. Contr.*, 39:262–267, 1992.

[8] J. A. Jensen. A model for the propagation and scattering of ultrasound in tissue. *J. Acoust. Soc. Am.*, 89:182–191, 1991a.

What is claimed is:

1. An apparatus for acquiring images of an object, the apparatus comprising:
   a generator for generating excitation signals of multiple pulses of wave energy, and an emitting transducer with a plurality of transducer elements for transforming the excitation signals into pulses of wave energy and, for each pulse of wave energy, using selected ones of the transducer elements for emitting the pulses of wave energy towards the object,
   a plurality of receiving transducer elements for receiving, from the object, signals generated by interaction between the emitted pulses of wave energy and the object,
   a receive beam former for delaying signals from the plurality of receiving transducer elements individually relative to each other,
   and a processor for processing delayed signals from the plurality of receiving transducer elements to form images of the object, where a predetermined number of processed and delayed signals are used to form an image to be displayed, and for updating displayed images with a number less than the predetermined number of processed and delayed signals that are used to form an image, and for displaying the thus updated images.

2. An apparatus according to claim 1 wherein displayed images are updated and displayed after each emission of energy.

3. An apparatus according to claim 2 wherein focused simultaneous beams are updated after each emission of energy according to $$S_l^{(n-1)}(t) = \sum_{m=(n-N_{xmt})}^{n-1} a_{k(m)} \cdot s_{lk(m)}^{(m)}(t)$$

$$S_l^{(n)}(t) = \sum_{m=(n-N_{xmt}+1)}^{n} a_{k(m)} \cdot s_{lk(m)}^{(m)}(t)$$

$$S_l^{(n)} = S_l^{(n-1)} + a_{k(n)} \cdot s_{lk(n)}^{(n)}(t) - a_{k(n-N_{xmt})} \cdot s_{lk(n-N_{xmt})}^{(n-N_{xmt})}(t)$$

$$S_l^{(n)} = S_l^{(n-1)} + a_{k(n)} \cdot s_{lk(n)}^{(n)}(t) - a_{k(n-N_{xmt})} \cdot s_{lk(n-N_{xmt})}^{(n-N_{xmt})}(t)$$

where $s_{lk}^{(n)}$ is the beam formed signal at emission n with element k for image line l, $a_{k(m)}$ is a weighting coefficient, and $N_{xmt}$ is the number of transmissions between two emissions with the same element.

4. An apparatus according to claim 3 wherein the focused simultaneous beams are updated after each emission of energy according to $$S_l^{(n)}(t) = c_1 \cdot S_l^{(n-1)} + c_2 \cdot s_{lk}^{(n)}(t) \quad (24)$$

where $c_1$ and $c_2$ are weighting coefficients.

5. An apparatus according to claim 1 wherein the wave energy is sound energy.

6. An apparatus according to claim 5 wherein the sound energy is ultrasound energy.

7. An apparatus according to claim 1 wherein the wave energy is electromagnetic energy.

8. An apparatus according to claim 1 wherein a number of transducer elements are used at the same time during transmission.

9. An apparatus according to claim 8 wherein the focused beams are updated after each emission of energy.

10. An apparatus according to claim 9 wherein the focused beams are updated after each emission of energy according to $$S_l^{(n-1)}(t) = \sum_{m=(n-N_{xmt})}^{n-1} a_{k(m)} \cdot s_{lk(m)}^{(m)}(t)$$

$$S_l^{(n)}(t) = \sum_{m=(n-N_{xmt}+1)}^{n} a_{k(m)} \cdot s_{lk(m)}^{(m)}(t)$$

$$S_l^{(n)} = S_l^{(n-1)} + a_{k(n)} \cdot s_{lk(n)}^{(n)}(t) - a_{k(n-N_{xmt})} \cdot s_{lk(n-N_{xmt})}^{(n-N_{xmt})}(t)$$

$$S_l^{(n)} = S_l^{(n-1)} + a_{k(n)} \cdot s_{lk(n)}^{(n)}(t) - a_{k(n-N_{xmt})} \cdot s_{lk(n-N_{xmt})}^{(n-N_{xmt})}(t)$$

where $s_{lk}^{(n)}$ is the beam formed signal at emission n with element k for image line l, $a_{k(m)}$ is a weighting coefficient, and $N_{xmt}$ is the number of transmissions between two emissions with the same element.

11. An apparatus according to claim 9 wherein the focused beams are updated after each emission of energy according to $$S_l^{(n)}(t)=c_1 \cdot S_l^{(n-1)}+c_2 \cdot s_{lk}^{(n)}(t) \qquad (25)$$

where $c_1$ and $c_2$ are weighting coefficients.

12. An apparatus according to claim 9 wherein the wave energy is sound energy.

13. An apparatus according to claim 9 wherein the sound energy is ultrasound energy.

14. An apparatus according to claim 9 wherein the wave energy is electromagnetic energy.

15. A method for acquiring images of an object, the method comprising:

generating excitation signals of multiple pulses of wave energy, transforming, using a transducer with a plurality of transducer elements, the excitation signals into pulses of wave energy and, for each pulse of wave energy, using selected ones of the transducer elements for emitting the pulses of wave energy towards the object, receiving from the object, using a transducer with a plurality of transducer elements, signals generated by interaction between the emitted pulses of wave energy and the object, delaying signals from the plurality of receiving transducer elements individually relative to each other, processing delayed signals from the plurality of receiving transducer elements to form images of the object, where a predetermined number of processed and delayed signals are used to form an image, and displaying the thus formed image, updating displayed images with a number less than the predetermined number of processed and delayed signals that are used to form an image, and displaying the thus updated images.

16. A method according to claim 15 wherein images are updated and displayed after each emission of energy.

17. A method according to claim 16 wherein focused simultaneous beams are updated after each emission of energy according to $$S_l^{(n-1)}(t) = \sum_{m=(n-Nxmt)}^{n-1} a_{k(m)} \cdot s_{lk(m)}^{(m)}(t)$$

$$S_l^{(n)}(t) = \sum_{m=(n-Nxmt+1)}^{n} a_{k(m)} \cdot s_{lk(m)}^{(m)}(t)$$

-continued $$S_l^{(n)} = S_l^{(n-1)} + a_{k(n)} \cdot s_{lk(n)}^{(n)}(t) - a_{k(n-Nxmt)} \cdot s_{lk(n-Nxmt)}^{(n-Nxmt)}(t)$$

$$S_l^{(n)} = S_l^{(n-1)} + a_{k(n)} \cdot s_{lk(n)}^{(n)}(t) - a_{k(n-Nxmt)} \cdot s_{lk(n-Nxmt)}^{(n-Nxmt)}(t)$$

where $s_{lk}^{(n)}$ is the beam formed signal at emission n with element k for image line l, $a_{k(m)}$ is a weighting coefficient, and $N_{xmt}$ is the number of transmissions between two emissions with the same element.

18. A method according to claim 17 wherein focused simultaneous beams are updated after each emission of energy according to $$S_l^{(n)}(t)=c_1 \cdot S_l^{(n-1)}+c_2 \cdot s_{lk}^{(n)}(t) \qquad (24)$$

where $c_1$ and $c_2$ are weighting coefficients.

19. A method according to claim 15 wherein the wave energy is sound energy.

20. A method according to claim 19 wherein the sound energy is ultrasound energy.

21. A method according to claim 15 wherein the wave energy is electromagnetic energy.

22. A method according to claim 15 wherein a number of transducer elements are used at the same time during transmission.

23. A method according to claim 22 wherein the focused beams are updated after each emission of energy.

24. A method according to claim 23 wherein the focused beams are updated after each emission of energy according to $$S_l^{(n-1)}(t) = \sum_{m=(n-Nxmt)}^{n-1} a_{k(m)} \cdot s_{lk(m)}^{(m)}(t)$$

$$S_l^{(n)}(t) = \sum_{m=(n-Nxmt+1)}^{n} a_{k(m)} \cdot s_{lk(m)}^{(m)}(t)$$

$$S_l^{(n)} = S_l^{(n-1)} + a_{k(n)} \cdot s_{lk(n)}^{(n)}(t) - a_{k(n-Nxmt)} \cdot s_{lk(n-Nxmt)}^{(n-Nxmt)}(t)$$

$$S_l^{(n)} = S_l^{(n-1)} + a_{k(n)} \cdot s_{lk(n)}^{(n)}(t) - a_{k(n-Nxmt)} \cdot s_{lk(n-Nxmt)}^{(n-Nxmt)}(t)$$

where $s_{lk}^{(n)}$ is the beam formed signal at emission n with element k for image line l, $a_{k(m)}$ is a weighting coefficient, and $N_{xmt}$ is the number of transmissions between two emissions with the same element.

25. A method according to claim 23 wherein the focused beams are updated after each emission of energy according to $$S_l^{(n)}(t)=c_1 \cdot S_l^{(n-1)}+c_2 \cdot s_{lk}^{(n)}(t) \qquad (25)$$

where $c_1$ and $c_2$ are weighting coefficients.

\* \* \* \* \*

UNITED STATES PATENT AND TRADEMARK OFFICE
CERTIFICATE OF CORRECTION

PATENT NO. : 6,689,063 B1
DATED : February 10, 2004
INVENTOR(S) : Jorgen Arendt Jensen et al.

It is certified that error appears in the above-identified patent and that said Letters Patent is hereby corrected as shown below:

Title page,
Item [57], ABSTRACT,
Line 13, "$f_0=3$" should read -- $f_0 = 3$ --.

Column 10,
Lines 27 and 63, delete "$S_1^{(n)}=S_1^{(n-1)}+a_{k(n)} \cdot s_{1k(n)}^{(n)}(t)-a_{k(n-Nxmt)} \cdot s_{lk(n-Nxmt)}^{(n-Nxmt)}(t)$".

Column 12,
Lines 6 and 42, delete "$S_1^{(n)}=S_1^{(n-1)}+a_{k(n)} \cdot s_{1k(n)}^{(n)}(t)-a_{k(n-Nxmt)} \cdot s_{lk(n-Nxmt)}^{(n-Nxmt)}(t)$".

Signed and Sealed this

Twenty-fourth Day of August, 2004

JON W. DUDAS
*Director of the United States Patent and Trademark Office*